United States Patent [19]

Henneberg et al.

[11] Patent Number: 4,748,540
[45] Date of Patent: May 31, 1988

[54] COMPACT PACKAGING OF ELECTRONIC EQUIPMENT WITHIN A SMALL PROFILE ENCLOSURE

[75] Inventors: Helmut H. Henneberg, Canton; Richard R. Dillon, Wellesley, both of Mass.

[73] Assignee: Honeywell Bull Inc., Waltham, Mass.

[21] Appl. No.: 42,405

[22] Filed: Apr. 24, 1987

[51] Int. Cl.$^4$ .............................................. H05K 7/20
[52] U.S. Cl. .................................. 361/424; 361/383; 361/390; 361/415
[58] Field of Search ..................... 439/55, 59, 62, 485; 165/80.2, 80.3; 312/223, 198; 361/383, 384, 390, 394, 395, 399, 415, 424, 428, 429; 174/16 R, 35 R

[56] References Cited

U.S. PATENT DOCUMENTS

| | | | |
|---|---|---|---|
| 2,077,160 | 4/1937 | Wilson, Jr. | 361/390 |
| 3,188,524 | 6/1965 | Williams | 361/390 |
| 3,679,829 | 7/1972 | Hofmeister | 361/390 |
| 3,691,432 | 9/1972 | Edfors | 361/384 |
| 3,697,815 | 10/1972 | Grant | 361/415 |
| 4,233,644 | 11/1980 | Hwang | 361/384 |
| 4,447,856 | 5/1984 | Takahashi | 361/415 |
| 4,479,263 | 10/1984 | Rosenfeldt | 361/390 |
| 4,683,424 | 7/1987 | Cutright | 361/383 |

FOREIGN PATENT DOCUMENTS 601044 10/1931 Fed. Rep. of Germany ...... 361/428

Primary Examiner—G. P. Tolin
Attorney, Agent, or Firm—Faith F. Driscoll; John S. Solakian

[57] ABSTRACT

The electronic equipment of a computer system including electronic cards, power supplies, peripheral units, cooling units and internal and external cables are compactly packaged within a small enclosure in a way which permits sufficient airflow from front to rear of the enclosure. The enclosure includes a pair of rail members located at the rear which have a plurality of mounting positions for attaching a corresponding number of modular shelf members which are angled to permit the flow of air through established airflow paths. The rail and shelf members collectively form a bulkhead structure. The rail members are offset from the sides of the frame so as to form vertical channels on each side. The channels are used for retaining external cables which plug into connectors mounted on the shelf members and are distributed so as not to interfere with airflow.

20 Claims, 9 Drawing Sheets

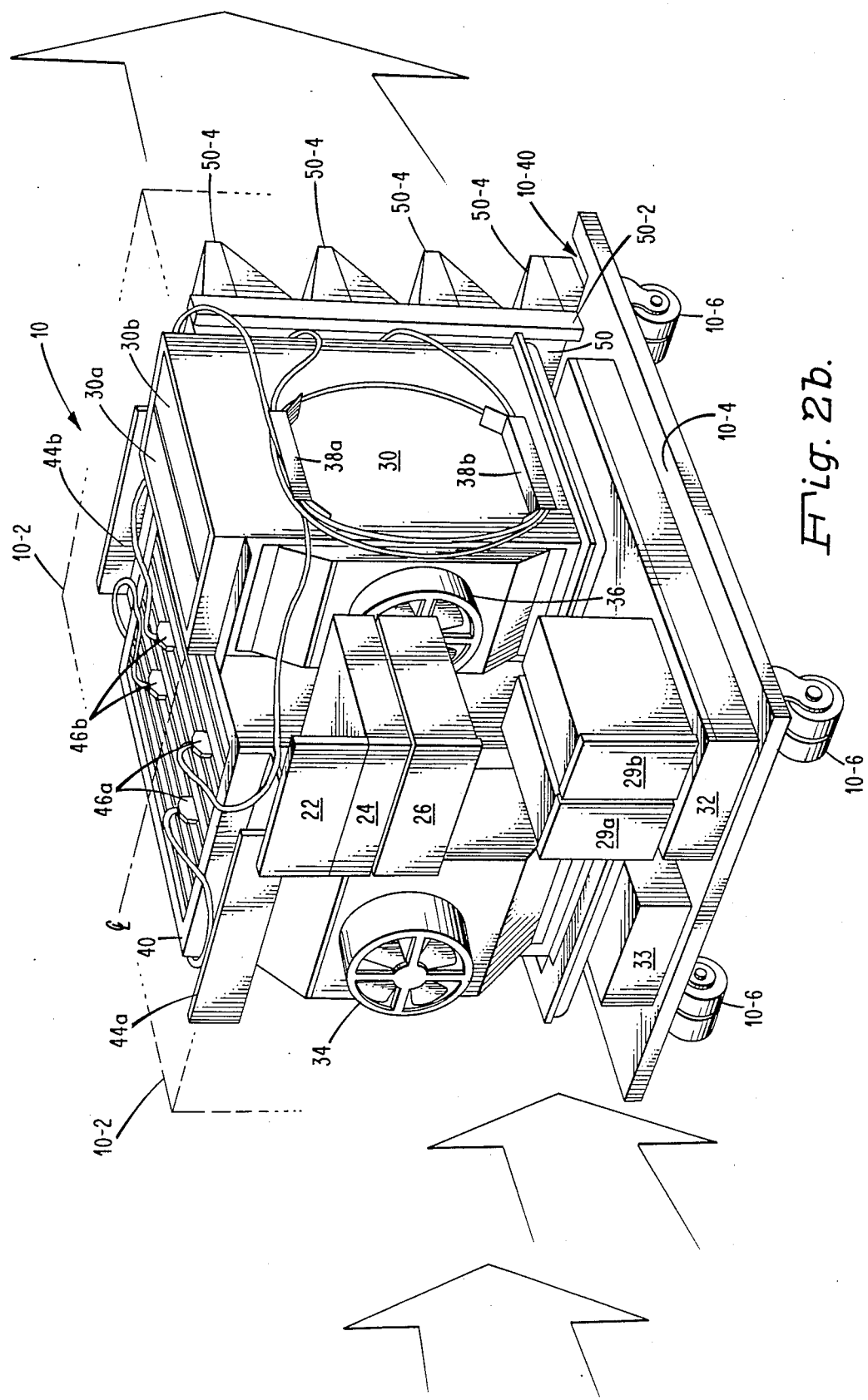

COMPACT PACKAGING OF ELECTRONIC EQUIPMENT WITHIN A SMALL PROFILE ENCLOSURE

BACKGROUND OF THE INVENTION

1. Field of Use

The present invention relates to apparatus used in the packaging of electronic equipment and more particularly to apparatus for packaging the different devices which comprise a computer system.

2. Prior Art

As the use of data processing systems continues to grow, there is an increasing need to provide added flexibility in expanding and configuring parts of such systems and in their connectability. This has resulted in data processing systems being constructed in a modular fashion, with removable side panels for joining together several modular units to provide a particular configuration. An example of such a system is disclosed in U.S. Pat. No. 3,691,432 which is assigned to the same assignee as named herein.

As computers become a part of today's office and business workplace, it becomes more important to be able to integrate computers within such environment. Thus, computers and their modular units have been sized to become more and more compatible with other units normally found in the workplace, such as office furniture. However, the reduction in the heights of such units has made it more difficult to provide adequate cooling and manage internal and external cabling within these computer systems. The problem of cable management is further complicated when cabling is carried out using standard length cables to reduce manufacturing costs.

Generally, prior art computer systems have connected internal and external cables to bulkheads at the back of the computer modular units. However, the number of devices packaged in these modular units were relatively small. Thus, there was sufficient airflow and that the amount of internal cabling was also small. In order to access the devices within such units, it was necessary to provide adequate space between the units and the walls of the workspace areas. In certain instances, this space was used for storing the excess cabling of externally connected standard length cables.

The related copending patent application titled, "Electronic Equipment Housing", Ser. No. 06/868,408, filed on May 29, 1986, by Richard R. Dillon, et al., provides an arrangement which facilitates cable management and enables the devices of a computer system to be packaged in cabinets having a height dimension which is compatible with the generally low profiled office furniture. The arrangement provides for packaging commonly shared equipment such as input/output interfaces and disk drive devices into one cabinet and the processor printed cicuit cards and memory boards into another cabinet.

The common equipment cabinet also includes a bulkhead having a plurality of swing-out sections for mounting on connectors to interconnect external and internal standard length cables. The bulkhead is located within the common equipment cabinet which is at one end of the row of cabinets comprising the particular computer configuration. The cabinets, each include internally mounted front and rear raceways for retaining standard length internal cables which have their ends connected to the connectors of the bulkhead and to printed circuit card connectors.

While the above arrangement provides ease of access to the computer devices and cards housed within the cabinets, it requires that the processor and memory boards be packaged within separate cabinets and that the shared equipment and bulkhead be included within a second cabinet.

In many instances, it is desirable to provide a computer configuration which is more compact and can be packaged within a single cabinet. Also, it is desirable to have the cabinet or enclosure conform to and still be compatible with the low profile of the workspace furniture. Moreover, it becomes desirable to provide an enclosure which has a small or narrow width profile. It has been found that the packaging and cable bulkhead arrangement of the above copending patent application does not allow further compacting of computer devices without introducing cooling problems.

Accordingly, it is a primary object of the present invention to provide a compact packaging arrangement that allows the fitting of the electronic equipment of a computer into a single small profile cabinet.

It is a further object of the present invention to provide compact packaging within a cabinet so that the dimensions are compatible with the enclosures for packaging electronic equipment of larger computer configurations.

SUMMARY OF THE INVENTION

The above and other objects of the present invention are achieved by the packaging arrangement of a preferred embodiment. In the embodiment, the electronic equipment of a computer system is compactly packaged within a small enclosure in a manner which permits a sufficient flow of air from the front to the rear of the enclosure. A pair of rail members are located at the rear of the enclosure and have a plurality of mounting positions for attaching a corresponding number of modular shelf members. The rail and shelf members collectively form a bulkhead structure. Additionally, each shelf member has a plurality of connector plates which allow external and internal standard length cables to be easily connected and disconnected via their attached connectors.

The rail members are offset from the frame at the rear of the enclosure to form vertical channels on each side. Standard length external cables arranged to exit the enclosure through a cutaway section at the bottom, are evenly distributed and placed within the vertical channels so as not to interfere with established airflow patterns. The modular shelf members are angled relative to a horizontal reference plane so as to provide the required amount of airflow. This arrangement also has the added benefit of making more space available facilitating access to cables and their connections. Also, the arrangement eliminates the need for hinges or swing out bulkhead sections.

The bulkhead structure is also constructed to shield the computer devices from electro-magnetic interference (EMI) and radio frequency interference (RFI) signals. That is, in the preferred embodiment, conductive screening is mounted across the back of the bulkhead structure between shelf positions to make proper ground contact so as to eliminate RFI and EMI signals from entering or leaving the enclosure. The enclosure has a hinged top which allows for ease of access to the vertically mounted printed circuit boards and power supplies or modules. This makes the enclosure compatible with enclosures of the type disclosed in the related patent application of Richard R. Dillon et al.

The novel features which are believed to be characteristic of the invention, both as to its orginization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 2b is a partial front view of the enclosure of FIG. 2a with the frame removed to better illustrate the arrangement of electronic equipment within the enclosure space according to the teachings of the present invention.

DETAILED DESCRIPTION OF THE PREFERRED EMBODIMENT

Figure 1:
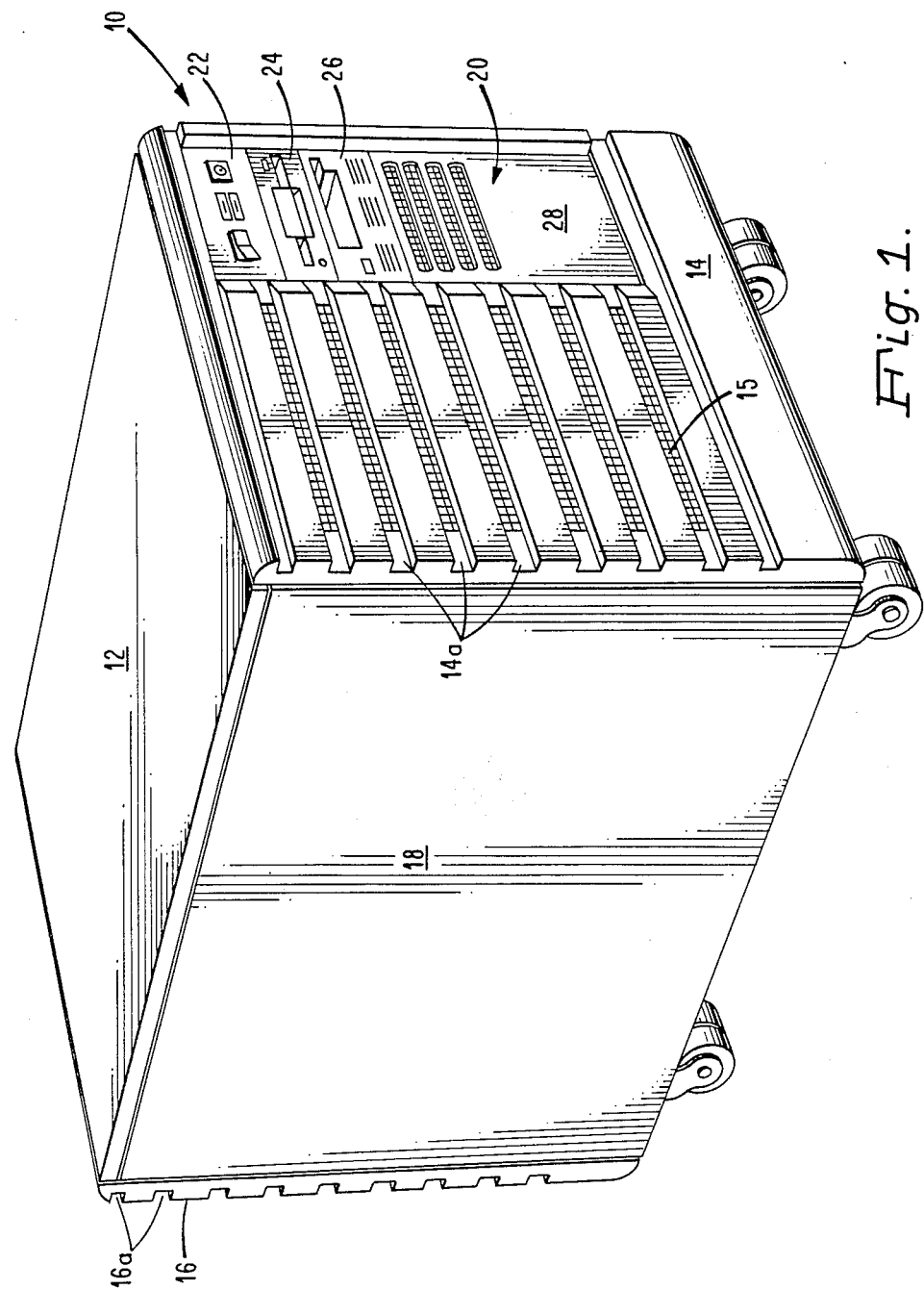
FIG. 1 is a partial front view of a small profile enclosure constructed according to the teachings of the present invention.

FIG. 1 is a three-dimensional view of an enclosure 10 constructed according to the present invention. The enclosure 10 includes a hinged lift-off top external cover 12, front and rear attachable panels 14 and 16 and attachable side panels, only the left side panel 18 being shown. For the purpose of the present invention, the panels are attachable to the frame 10-2 of enclosure 10 in a conventional manner by screws or pins.

Figure 2A:
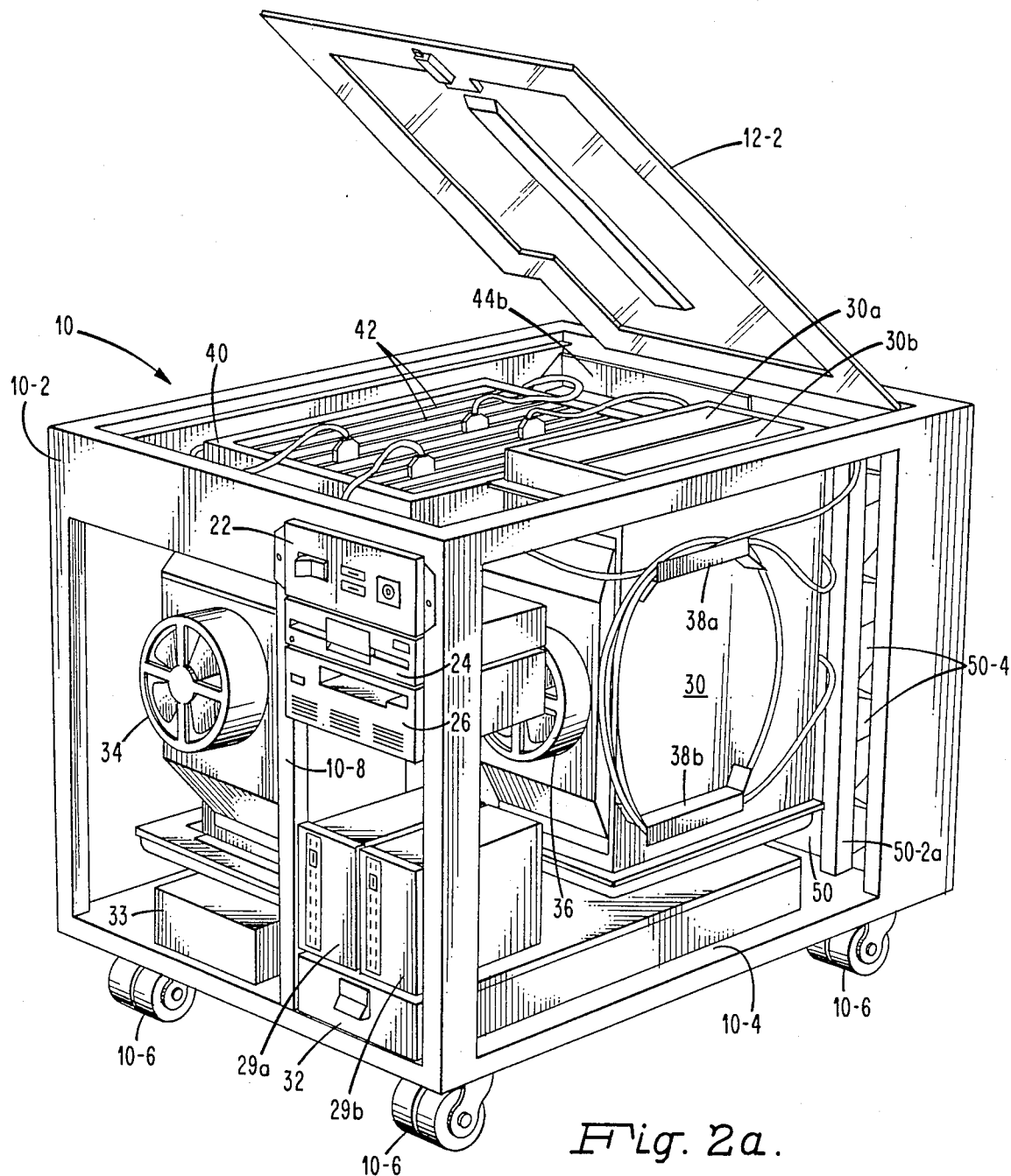
FIG. 2a is a partial front view of the enclosure of FIG. 1 with the top cover, front and side panels removed to better illustrate the compact packaging arrangement of the present invention.

As shown, the right side of the front panel 14 includes a rectangular cutout portion 20 for enabling operator access to a control panel 22, a 5¼ inch diskette device 24, a streamer tape device 26 and a louvered panel 28. A pair of disk devices 29a and 29b and a power distribution unit (PDU) 32 are mounted behind panel 28 as shown in FIG. 2a. The peripheral devices (e.g., 26 through 29b) are housed within metal chassis (not shown) attached to frame 10-2 and which are perforated for cooling.

The left side of panel 14 and the rear panel 16 include a plurality of horizontal slotted openings 14a and 16a respectively. Conductive screening 15 is mounted on back of panel 14 to eliminate the escape of radio frequency interference (RFI) signals from enclosure 10.

The hinged top cover 12 is so designed that when opened, it remains in an open position without need for further support, until it is closed. The power control panel 22 has a power switch, a pair of indicator lights and a lock, all of which are shown in greater detail in FIG. 2a. From FIG. 2a, it is seen that the top cover, front and left side panels have been removed and a clear plastic cover 12-2 is shown in an opened position.

The devices previously mentioned described in connection with FIG. 1 are arranged as shown. The enclosure 10 includes a rectangular frame 10-2 which has base pan 10-4 and sets of casters 10-6 mounted on the bottom at each corner of frame 10-2 as indicated. The front of frame 10-2 is partitioned into two sections by vertical member 10-8. The power control panel 22, disk and streamer tape devices 24 and 26, disk devices 29a and 29b and PDU 32 are mounted in the front of the right section of frame 10-2 in a conventional manner by means of screws or appropriate brackets.

The left front section of frame 10-2 houses a communication adapter or line interface unit 33 and a cooling fan unit 34 for the computer's electronic circuits. That is, enclosure 10 includes a chassis or card tray 40 which is mounted to frame 10-2 by screws or appropriate brackets. As shown, tray 40 includes a plurality of vertically mounted printed circuit cards 42 which are air cooled by fan 34 mounted in a conventional manner at the front of tray 40.

In the preferred embodiment, tray 40 includes eight card slots for holding a corresponding number of cards 42 which contain the electrical circuits which make up the computer's processor and memory circuits. As described with reference to FIG. 2b, each of the cards 42 can have up to four evenly distributed edge connectors which connect to a corresponding number of internal standard length cables.

Additionally, enclosure 10 further includes a pair of power supplies 30a and 30b located adjacent to tray 40 so as to be operator accessible. The supplies or power modules 30a and 30b are air cooled by a centrally located fan 36 mounted at the front of the power supply chassis or housing 30. Both fans 34 and 36 are strategically placed within enclosure 10 to minimize noise to meet strict acoustic office environmental standards. To further reduce noise levels, conventional variable speed controlled fans are employed.

A pair of horizontal brackets 38a and 38b are mounted on the right side of the power supply chassis. Another pair of brackets are mounted on the left side of tray 40. The brackets are used for coiling excess internal cabling as shown and described in greater detail in FIG. 2b herein.

Enclosure 10 further includes a pair of vertical rail members 50-2a and 50-2b, only one of which is shown in FIG. 2a. The rail members 50-2a and 50-2b include four mounting positions for attaching a corresponding number of modular shelves 50-4, only portions of which are shown in FIG. 2a. The rail and shelf members collectively form a bulkhead structure 50, shown in more complete detail in FIGS. 3 and 4a. Each of the rail members 50-2a and 50-2b is positioned near the sides of rear part of frame 10-2 so as to form a pair of vertical channels for retaining external cables used by the computer system.

In FIG. 2b, frame 10-2 has been removed to better illustrate the manner in which the internal cables are managed. As seen from FIG. 2b, U-shaped troughs or cable raceways 44a and 44b are mounted at the front and the rear of the tray 40 as shown. Additionally, base pan 10-4 has a cutback section 10-40 for exiting external cables therethrough as explained herein.

The connectors which connect to printed circuit cards 42 are evenly distributed along each card and connect to the ends of the standard length cables as shown. For ease of illustration, only a small number of connectors and cables are shown. The cable connectors 46a located to the left of a centerline $C_L$, nearer to the front of enclosure 10, connect to standard length cables which are placed into the front trough 44a. The cable connectors 46b located to the right of the centerline $C_L$ have their cables placed into the rear trough 44b. In both instances, the excess amount of cabling is wrapped around brackets 38a and 38b on each side in clockwise and counterclockwise directions as indicated. From there, the other ends of the cables are connected to connector plates contained in the modular shelves of bulkhead structure 50.

Figure 2C:
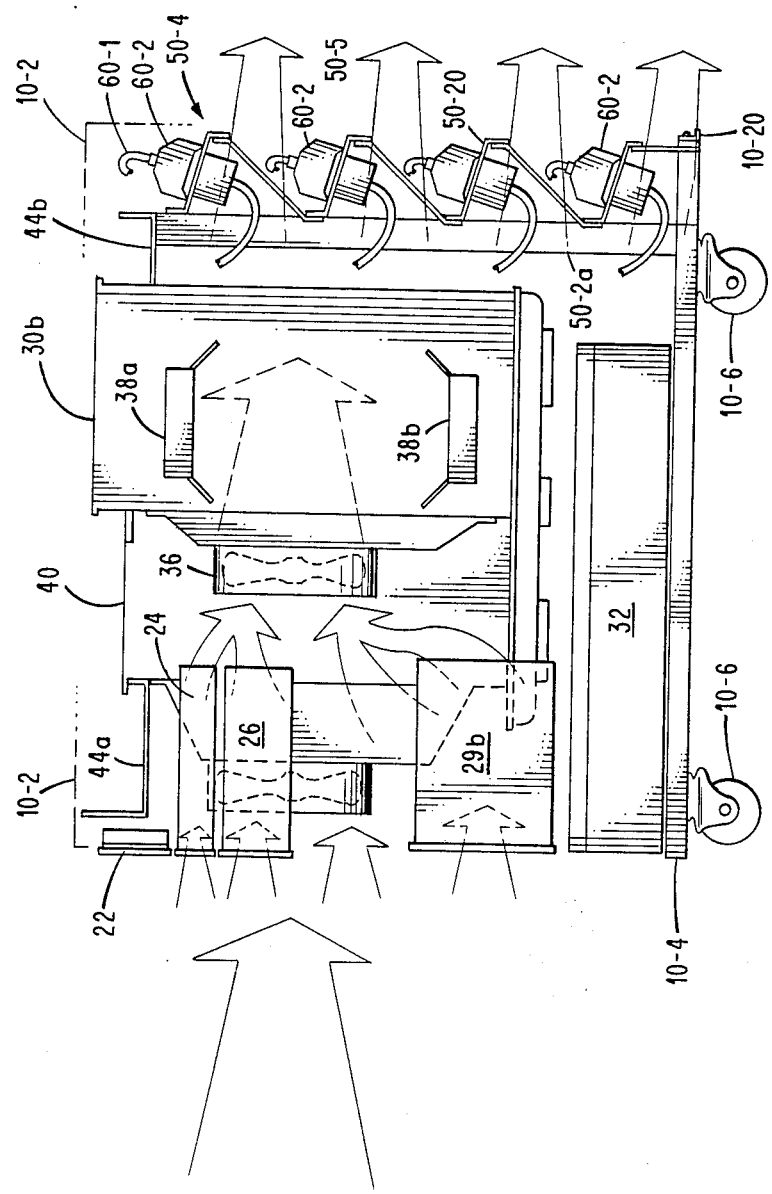
FIG. 2c is a side view of the enclosure of FIG. 1 showing the airflow paths according to the teachings of the present invention.

FIG. 2b shows the internal arrangement of the devices of the computer system of FIG. 2b with frame 10-2 removed. The overall flow of air through enclosure 10 is shown as entering the front of the enclosure and exiting through the rear. Part of frame 10-2 is shown in dotted lines for reference. FIG. 2c illustrates in greater detail, the established airflow paths which will be discussed in greater detail herein.

Figure 3:
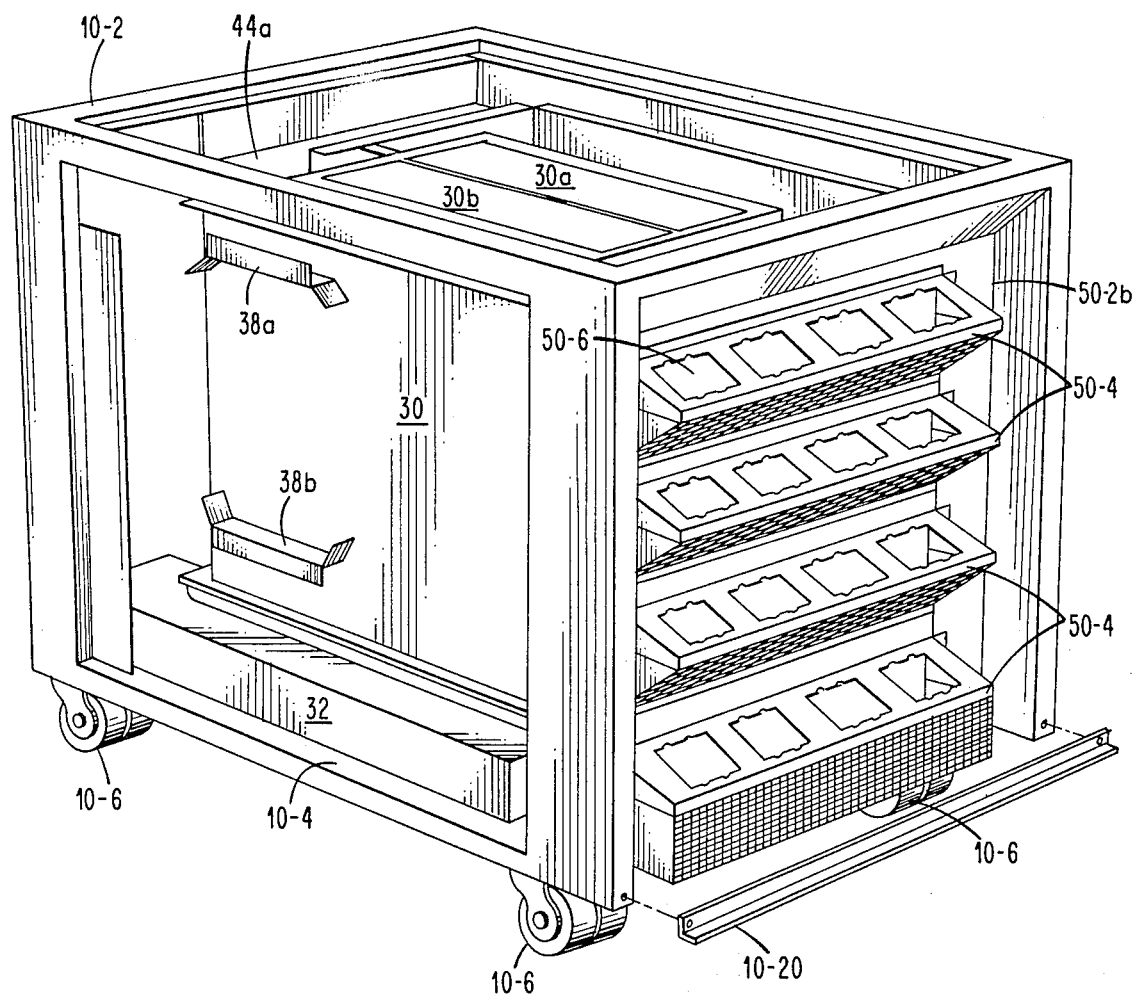
FIG. 3 is a partial rear view of the enclosure of FIG. 1 showing a bulkhead structure constructed according to the teachings of the present invention.
Figure 4A:
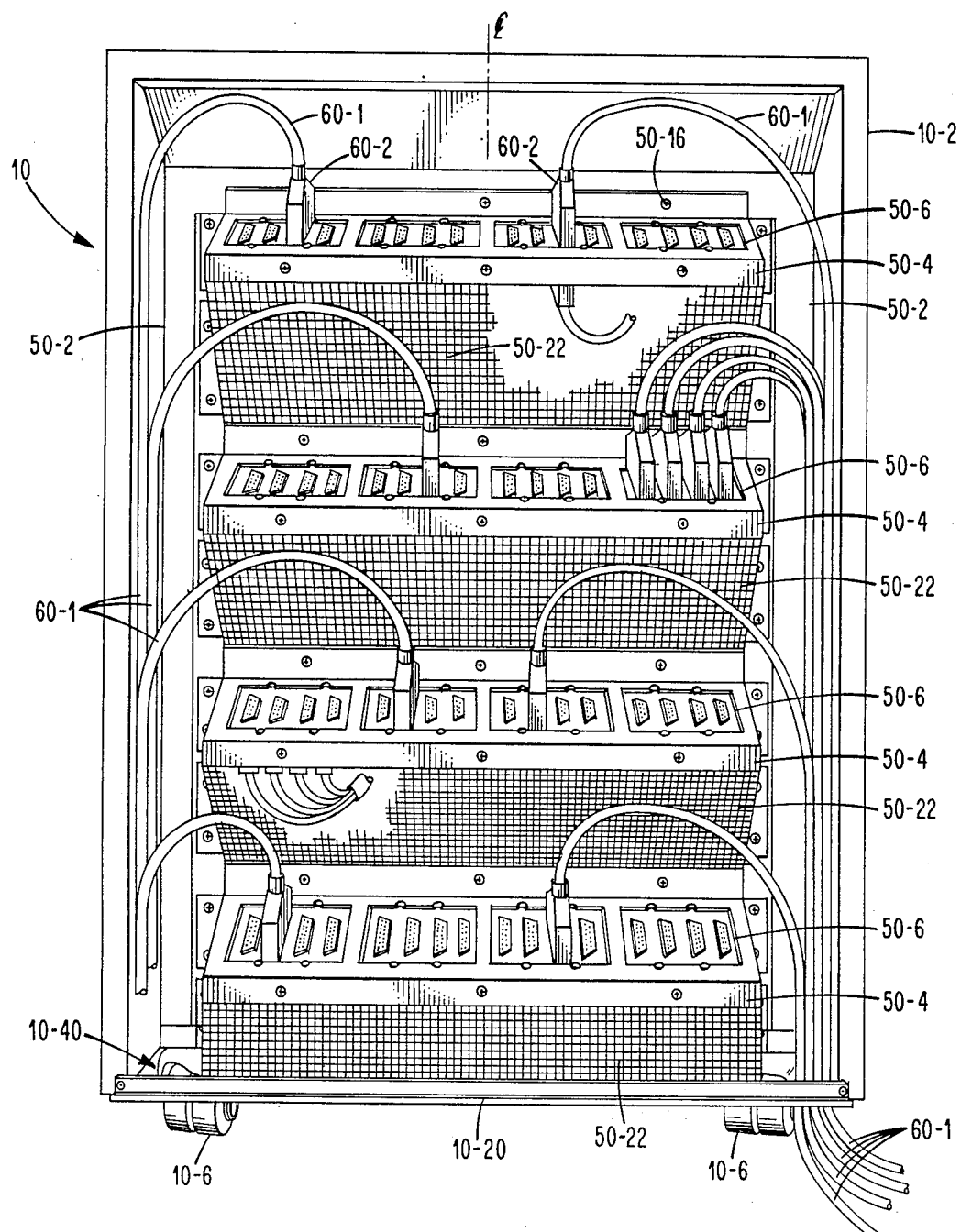
FIG. 4a is an enlarged rear elevation view of the bulkhead structure of FIG. 3 showing the management of standard length cables according to the teachings of the present invention.

FIG. 3 illustrates in greater detail, the construction of bulkhead structure 50. This figure and FIG. 4a shown the maximum number of modular shelves 50-4 mounted at all rail member positions. Each modular shelf 50-4 includes a plurality of cutouts 50-6 into which connector or filler plates are mounted. As seen from FIG. 3, frame 10-2 has a removable retaining piece 10-20 for holding the external cables in place. Additionally, retaining piece 10-20 provides support for removable rear panel 16 of FIG. 1.

Figure 4B:
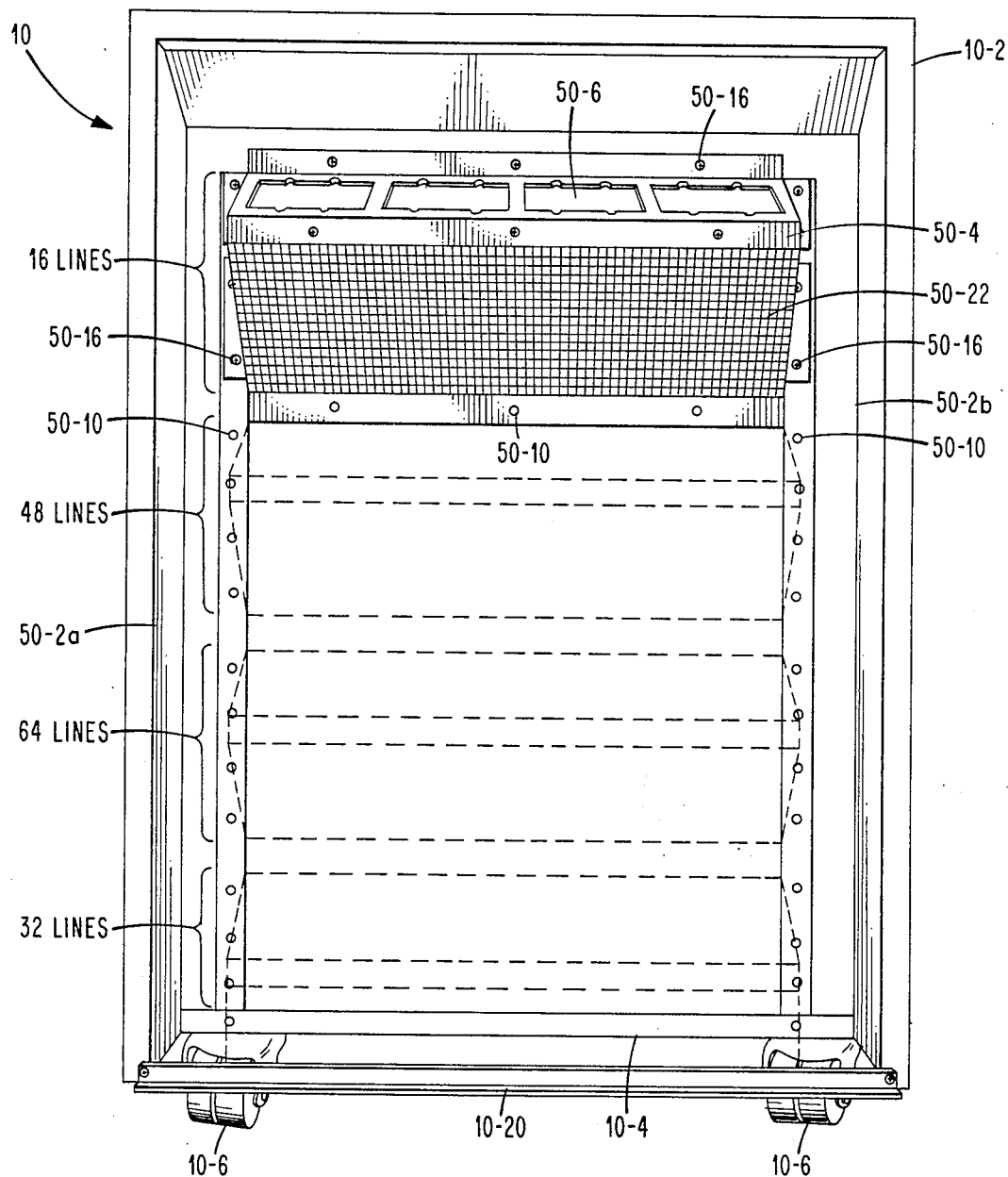
FIG. 4b is an enlarged rear view of the bulkhead structure of FIG. 3 illustrating the modular organization of shelves according to the teachings of the present invention.
Figure 4C:
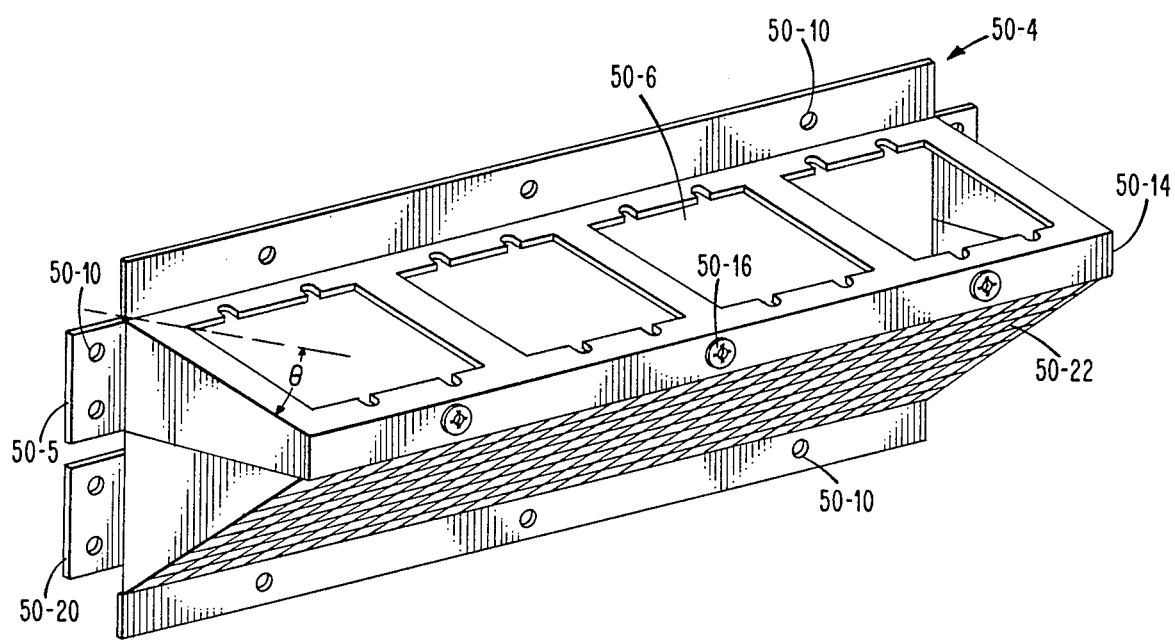
FIG. 4c is an enlarged view of a modular shelf of FIG. 3 constructed according to the present invention.

Each modular shelf is constructed generally as shown in FIG. 4c. Referring to FIG. 4c, it is seen that each modular shelf 50-4 has two major sections, a solid upper section 50-5 and a vented lower section 50-20. The upper section 50-5 includes four cutouts 50-6 for holding connector or filler plates. Filler plates are inserted into the unused cutouts 50-6 to maintain the established airflow paths as well as to suppress RFI and EMI signal emissions.

The lower section 50-20 of each shelf 50-4 is vented by conductive screening 50-12 which provides sufficient airflow in addition to preventing RFI and EMI signals from entering and leaving enclosure 10. The two sections 50-5 and 50-20 of each shelf 50-4 are bolted or riveted together by three TORX head screws 50-1b. The screws are inserted into the three holes of solid horizontal strips at the bottom and top parts of the upper and lower sections overlayed as shown in FIG. 2c. All of the modular shelves 50-4 except the last shelf have vented lower sections 50-20 shaped as shown in FIG. 4c. This enables the vented lower section 50-20 of each modular shelf 50-4 to be attached to the upper section of a succeeding modular shelf 50-4 as described herein. The modular shelf 50-4 located nearest to the bottom has a rectangular flat vented lower section.

The upper section 50-5 of the top modular shelf 50-4 is held in place by seven screws which are used to attach the shelf to rail members 50-2a and 50-2b and the top of the frame via holes 50-10. The lower section 50-20 is similarly attached to rail members 50-2a and 50-2b via a pair of screws on each side. The remaining three screws are used to attach the bottom horizontal strip to the top portion of the upper section 50-5 of the next lower shelf 50-4.

The shelves 50-4 are constructed from a combination of electrically conductive material such as sheet steel with holes in the metal grid or mesh of the lower vented sections 50-20 sufficiently large to allow air to be blown vertically through for cooling purposes. However, the holes are still sufficiently small enough to suppress effectively EMI and RFI signals (i.e., act as an effective screen or shield). The mesh or conductive screening of vented sections are welded to the horizontal conductive strips to make good electrical contact.

According to the present invention, the top portion of each modular shelf 50-16 is angled so as to allow sufficient airflow. That is, in the preferred embodiment, an angle of 15° was established. That is, the angle $\theta$ between the top of shelf 50-4 and a horizontal reference plane approximates 15°. This prevents interference from external and internal cables and connectors which attach to each side of the connector plates as discussed herein.

FIG. 4b illustrates in greater detail, the preassigned shelf positions within bulkhead structure 50 according to the present invention. The number of modular shelves 50-4 which bulkhead structure 50 contains is a function of the number of communications lines that the computer configuration requires. Each modular shelf 50-4 is able to accommodate a maximum of 16 separate lines or cables. In a 16-line configuration, bulkhead structure 50 need only contain one shelf mounted as shown in FIG. 4b. For a 32-line configuration, another modular shelf 50-4 is added at the bottom position as shown. For 48 and 64 lines, the modular shelves are added to the middle positions as shown. For a configuration having less than 64 lines, flat rectangular conductive screening sections are used to cover the open areas thereby maintaining the established airflow and protecting against RFI and EMI signal emissions. These sections have horizontal strips at the top and bottom which contain holes for attaching to the upper and lower sections of shelf 50-4 as required.

FIG. 4a illustrates the manner in which external cables are connected to bulkhead structure 50. The bulkhead structure 50 can be viewed as being vertically divided into two equal sections denoted by a vertical centerline $C_L$. The connectors 60-2 of the external cables 60-1 to the left of the centerline connect to the first two connector plates on the left of the centerline and are placed into the vertical channel on the left side of enclosure 10. As mentioned previously, the vertical channels are formed by the rear vertical members of frame 10-2 and the rail members 50-2a and 50-2b of bulkhead structure 50. Similarly, the connectors 60-2 of the external cables 60-1 at the right of the centerline $C_L$ connect to the two connector plates on the right of the centerline and are placed into the vertical channel on the right side. The external cables within both channels exit through cutback section 10-40 located behind retaining member 10-20 as shown.

DESCRIPTION OF AIRFLOW PATHS

The manner in which the preferred embodiment of the present invention established predetermined airflow patterns will now be described with reference to FIG. 2c. Air enters the front of enclosure 10 through the louvered panel 28 of front panel 20 of FIG. 1. The disk and streamer tape devices 24 and 26 and disk devices 29a and 29b are mounted so as to provide a certain amount of space therebetween. The spacing is such that circulating fan 36 draws off air from the tops of all of the of the peripheral devices located in the front space (e.g., devices 22 through 29b) as shown in FIG. 2c. The small space between disk and streamer tape devices 24 and 26 and the space between the bottom of tape device 26 and top of disk devices 29a and 29b establish the airflow paths as shown.

The air entering the enclosure 10 passes through the disk devices 29a and 29b and exits as shown through the vented lower sections 50-20 of angled modular shelves 50-4 of bulkhead structure 50. The routing of internal and external cables in the manner described ensures a sufficient flow of air. By angling the modular shelves 50-4 in the manner taught by the present invention, the flow of air through bulkhead structure 50 ensures proper cooling. That is, the internal and external cabling and associated connectors which attach to each side of the connector plates are positioned so as not to interfere with airflow through the vented lower sections 50-20 of the modular shelves 50-4. The angle was selected as a function of the number and size of connectors and number of shelves which were required to be fitted into the allocated amount of space. Also, fan placement ensures low noise levels.

The arrangement of the present invention permits internal and external cables to be connected and disconnected within enclosure 10 without disturbing the effectiveness of the EMI and RFI shielding provided by bulkhead structure 50. Also, modular shelves can be added as required so as to maintain the same effectiveness.

Figure 5:
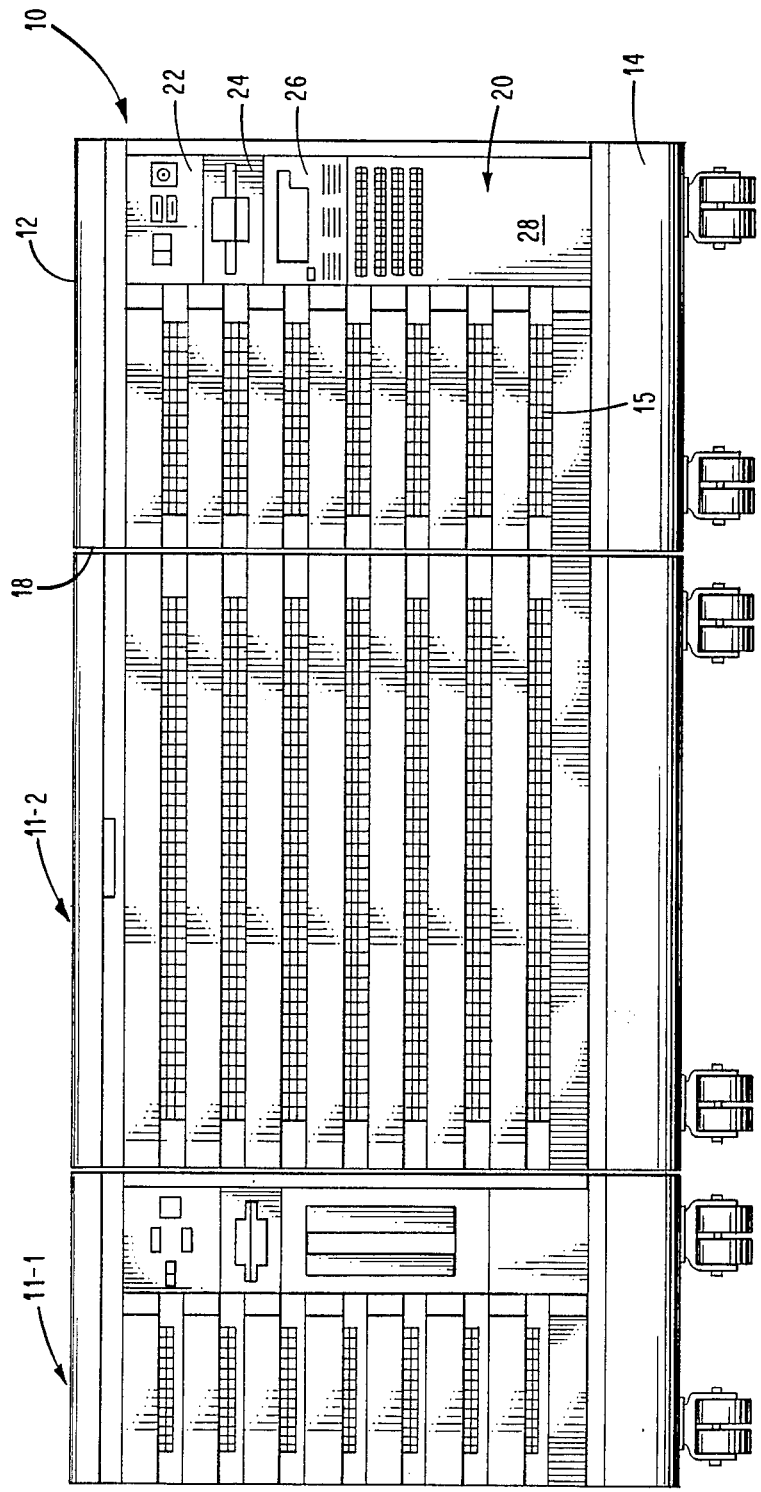
FIG. 5 is a front elevation view of a computer system which can be expanded to include the low profile enclosure of the present invention.

The arrangement of the present invention permits the different devices of a computer configuration to be compactly packaged within enclosure 10 characterized by a small profile or width. The width dimension of the enclosure of the preferred embodiment approximates 20 inches. Enclosure 10 is sized for compatibility with low profile characteristic of modern furniture and as such has a height dimension which approximates 30 inches. Moreover, enclosure 10 is compatible in size with larger computer configurations. This is illustrated in FIG. 5. As shown, enclosure 10 can be integrated with a system configuration having two enclosures 11-1 and 11-2 packaged as described in the above referenced related application. The narrow width dimension of enclosure 10 is compatible with the widths of enclosures 11-1 and 11-2 which normally approximate 15 and 30 inches respectively.

The above has shown how the arrangement of the present invention achieves a compact packaging of the devices of a computer configuration. In addition, to providing proper airflow within the enclosure, accessibility to both internal and external cable connections, the invention prevents interference from RFI and EMI signals.

It will be obvious to those skilled in the art that many changes may be made without departing from the teachings of the present invention. For example, the invention may be used with other than standard length cables, in which case, the brackets for coiling excess cable may be removed. The invention may be used with different types and sizes of connectors. Also, the dimensions of the enclosure, the types of peripheral devices and construction of modular shelves and number and associated angle of tilt may be changed as required for accommodating different computer configurations. For those computer configurations which do not require peripheral devices, the cutout portion of the front panel can be eliminated so that it resembles that of enclosure 11-2 of FIG. 5.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. An enclosure compactly packaging the electronic equipment of a computer system, said equipment including a tray of a plurality of electronic card equipment and a plurality of devices, said enclosure comprising:

a substantially rectangular open box-like frame with front and rear U-shaped integrated cable troughs mounted adjacent to the top at the front and rear of said frame;

said tray being mounted to said cable troughs and retaining said card elements in a vertical position, each of said card elements having a plurality of connectors;

a pair of vertical rail members mounted to the rear of said frame, said rail members having a plurality of fixed mounting positions and a number of modular vented shelf members mounted to different ones of said fixed mounting positions in a predetermined order, said rail and mounted shelf members collectively forming a bulkhead structure, each mounted shelf member having a predetermined downward tilt angle relative to a horizontal reference plane, said each shelf member including a plurality of cutouts mounting a corresponding number of connector plates; and, a plurality of internal cables, each cable being connected at one end to a different one of said card connectors and being routed through said cable troughs and adjacent said tray in a predetermined manner and connected at the other end to a different one of said connector plates of one of said shelf members.

2. The enclosure of claim 1 wherein said enclosure further includes conductive screening mounted across the back of said bulkhead structure between unused fixed mounting positions.

3. The enclosure of claim 1 wherein said plurality of devices includes a power supply chassis for containing a number of power supply modules, said chassis being positioned adjacent to said tray to make said modules operator accessible.

4. The enclosure of claim 3 wherein said enclosure further includes upper and lower bracket retaining means mounted to the side of said electronic tray and said power supply chassis for coiling excess slack in said cables.

5. The enclosure of claim 3 wherein said devices further include a plurality of peripheral units mounted to the front of said frame in front of said power chassis.

6. The enclosure of claim 3 wherein said enclosure further includes a vertical member partitioning the front of said frame into two sections, said card tray being mounted in one section, said power supply chassis and peripheral devices being mounted in another section, said power supply chassis being located near the rear of said frame and said peripheral devices mounted in front of said another section being spaced to provide a predetermined opening for an air path established by taking in air to be blown across the power supply modules and exhausted through said vented shelf members of said bulkhead structure.

7. The enclosure of claim 6 wherein said enclosure has removable front, rear and side panels, said front panel including a louvered panel on one side to control the intake of air so that air is also taken from the tops of said peripheral devices.

8. The enclosure of claim 1 wherein said vertical rail members are offset from the sides at the rear of said frame so as to form a vertical channel on each side, a plurality of standard length external cables, said external cables being connected at one end to said connector plates of said shelf members and evenly distributed within said vertical channels so as not to interfere with the flow of air through said vented shelf members.

9. The enclosure of claim 8 wherein said frame includes a basepan section, said section having a cutback portion for enabling said external cables on each side to exit therethrough.

10. The enclosure of claim 9 wherein said frame further includes a retaining bar mounted across the bottom of the rear of said frame, said retaining bar providing strain relief for said external cables and support for mounting said rear panel.

11. The enclosure of claim 1 wherein said predetermined downward tilt angle approximates 15 degrees.

12. The enclosure of claim 6 wherein said enclosure further includes a plurality of cooling units, a different one being mounted at the front of said tray and said power supply chassis for establishing said air path and still maintaining low acoustic noise levels.

13. An enclosure housing electronic equipment of a computer system, said enclosure including a frame having a base, front, rear and side sections and removable front, rear and side sections and removable front, rear and side panels, said enclosure further including:
   a pair of vertical rail members mounted to said base section near said rear section, said rail members being offset from said sections of said frame so as to form a vertical channel on each side and said rail members having a plurality of equally distributed fixed mounting positions; and
   a plurality of modular vented shelf members, mounted to different ones of said fixed mounting positions, said rail members and mounted shelf members collectively forming a bulkhead structure for said enclosure, each mounted shelf member having a plurality of cutouts mounting a corresponding number of connector plates for interconnecting internal and external cables and said each mounted shelf member having a predetermined downward tilt angle relative to a horizontal reference plane to permit the flow of air through the vented portions without interference from connectors which attach to each side of said connector plates of said each mounted modular shelf member and internal and external cables associated therewith, said external cables being distributed in a predetermined manner for retaining by said vertical channels.

14. The enclosure of claim 13 wherein each of said plurality of modular vented shelf members includes a solid angled upper section and a vented lower section, said upper section having said plurality of cutouts, said lower section having conductive screening and said upper and lower sections having a plurality of holes along the sides, tops and bottoms, said plurality of holes on said bottom and top of said upper and lower sections of each shelf member respectively being used to bolt said sections together and the remaining plurality of holes being used to attach each shelf member to one of said plurality of fixed mounting positions of said rail members and to another modular shelf member in a predetermined sequence.

15. The enclosure of claim 14 wherein said plurality of fixed mounting positions is 4 and wherein said predetermined sequence is a first shelf member mounted to the highest of said positions, a second shelf member to lowest of said positions, a third shelf member to next highest of said positions and a fourth shelf member to the next lowest position as a function of the capacity of said computer configuration.

16. The enclosure of claim 15 wherein rectangular sections of conductive screening are attached to said rail members and to the top and bottom of the sections of mounted shelf members covering any unused fixed mounting positions so as to maintain established airflow and protect against unwanted signal emissions.

17. The enclosure of claim 14 wherein said solid angled upper section has an angle of decline relative to said horizontal reference which approximates 15 degrees.

18. The enclosure of claim 13 wherein said plurality of shelf members are vertically divided into two equal sections, each of said external cables being distributed so as to be retained within one of said vertical channels near said rear of said frame which is closest to said section into which each of said external cables connects.

19. The enclosure of claim 18 wherein said base section of said frame has a cutback portion for enabling said external cables within said vertical channels to exit therethrough.

20. An enclosure packaging computer electronic equipment, said enclosure including a frame with front, rear, side and bottom sections, and removable front, rear and side panels attached to said front, rear and sides of said frame, said front and rear panels having slots for taking in and exhausting air through said equipment, said enclosure further comprising:
   retaining means mounted inside and adjacent to said frame holding internal cables which connect to said electronic equipment;
   a pair of vertical member means mounted on said bottom section of said frame inside said rear section and offset from said side sections by a predetermined amount so as to form side channels retaining external cables, said vertical member means having a plurality of fixed mounting positions; and
   a number of modular vented angled shelf member means mounted to different ones of said mounting positions in a predetermined sequence, said pair of vertical member means and said shelf member means forming a bulkhead structure, each shelf member means having first and second portions, said first portion having a predetermined declining slope relative to a horizontal reference plane and a plurality of connector plates and said second portion having conductive screening, said declining slope of said first portion enabling the connection of said internal and said external cables to both sides of said connector plates so as not to interface with said air being exhausted through said equipment.

* * * * *